Patented Aug. 11, 1925.

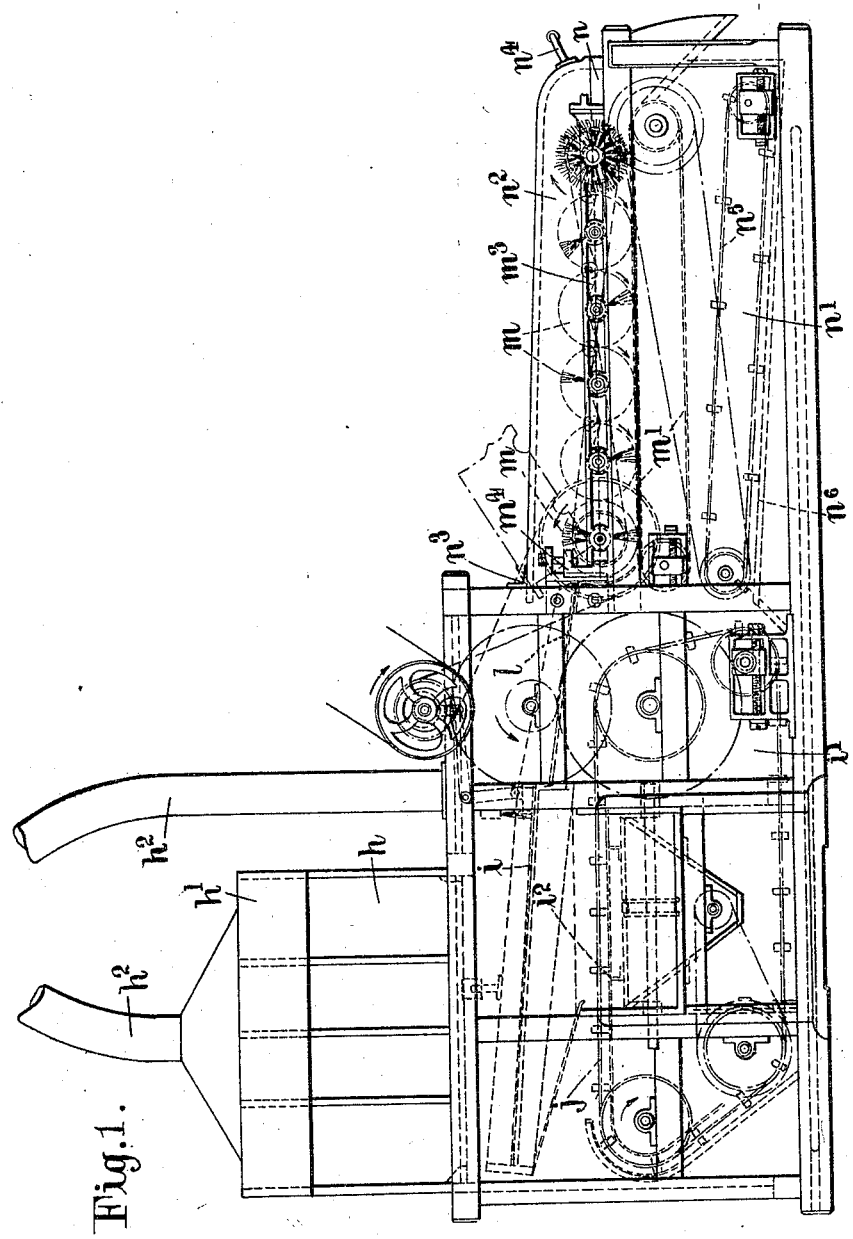

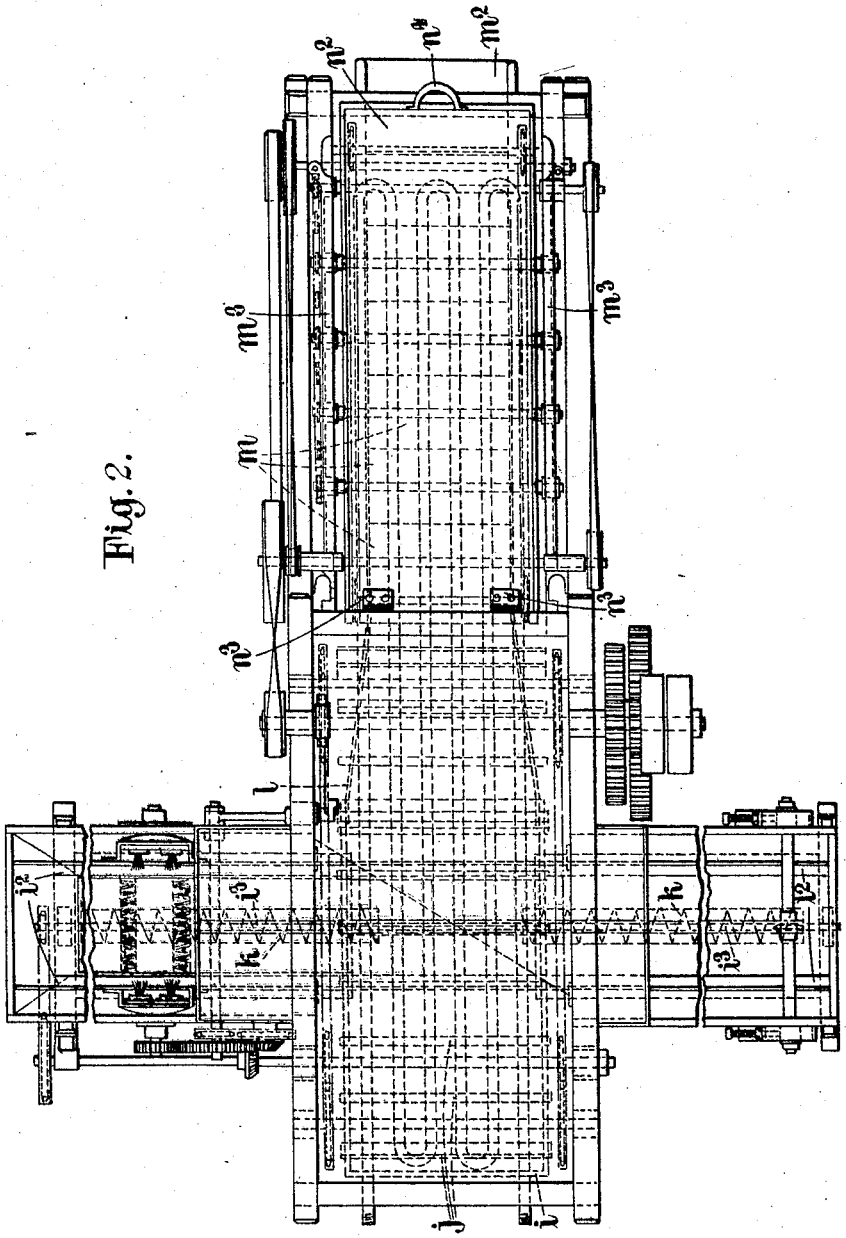

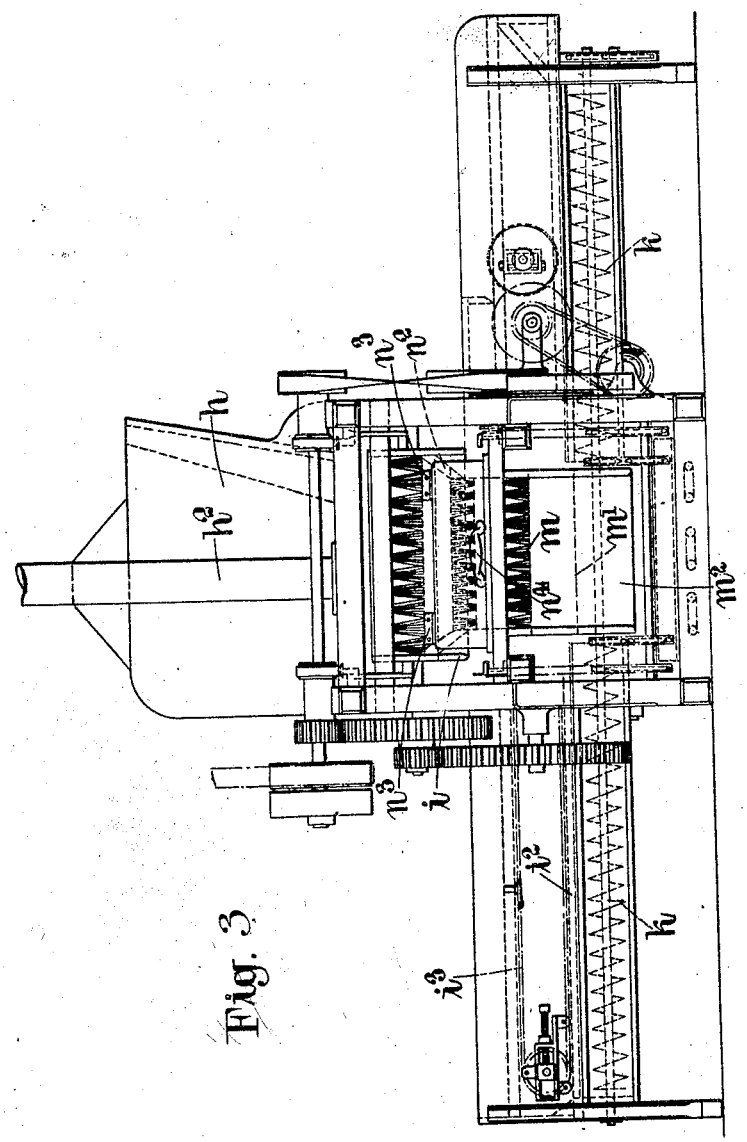

1,548,937

UNITED STATES PATENT OFFICE.

WALTER SAWFORD DYE, OF NORWICH, ENGLAND, ASSIGNOR TO BAKER-PERKINS COMPANY INCORPORATED, OF WHITE PLAINS, NEW YORK, A CORPORATION OF NEW YORK.

APPARATUS FOR USE IN CONNECTION WITH THE MANUFACTURE OF CONFECTIONERY AND THE LIKE.

Application filed March 7, 1925. Serial No. 13,888.

*To all whom it may concern:*

Be it known that I, WALTER SAWFORD DYE, residing at Norwich, England, a subject of the King of Great Britain and Ireland, have invented certain new and useful Improvements in or Relating to Apparatus for Use in Connection with the Manufacture of Confectionery and the like, of which the following is a specification.

This invention relates to apparatus for use in connection with the manufacture of confectionery and the like, for removing or cleaning off the starch or moulding material after moulding the confections, prior to their being crystallized or otherwise and of that type in which the confections are treated, whilst travelling on a conveyor of wire or other open work, to the action of rotary brushes which may if desired revolve in opposite directions and which remove the moulding material allowing it to fall through the conveyor for collection in any suitable manner.

According to this invention the confections are passed to a perforated screen and between the latter and the first of a series of rotary brushes, adapted to revolve in different directions, the screen being for instance curved to partly enclose said first brush, whereby it assists the confections to travel about same and leads them to the conveyor with which the brushes co-operate.

After treatment the confections are delivered in completely cleaned condition ready for further processes of manufacture if required.

All driving pulleys and bearings are disposed externally of the compartments so that no grease may contaminate the confectionery or the powder, while no hand labour of any kind is necessary once the confections have entered the apparatus until expelled for example on to trays. Appropriate driving mechanism and gearing for various speeds is incorporated according to requirements.

An embodiment of the invention is illustrated in the accompanying drawings in which Fig. 1 is an elevation showing the invention as combined with elements of a known form of confectionery cleaning or scouring apparatus. Fig. 2 is a plan view of Fig. 1, and Fig. 3 an end elevation thereof from the right.

In the drawings $h$ designates a feed hopper having a hood $h^1$ provided with piping $h^2$ leading to a suction fan, and $i$ designates an inclined longitudinally reciprocating or vibrating sieve receiving the confections and starch from the hopper into which they are fed from moulding trays. A paddle or conveyor $j$ is located below the sieve $i$ which conveys the starch shaken therethrough into a chamber $i^1$ back over trays which are conveyed along guides $i^2$ by a transverse chain conveyor $i^3$, and $k$ designates a worm conveyor which leads the starch falling from the trays back to the chamber $i^1$ to be acted on by the paddle $j$ for delivery to the trays.

In the application of the invention to the above mentioned known machine, the vibrating sieve $i$ delivers the confections to a curved wire or perforated screen $l$ which partly surrounds the first of a series of brushes $m$ of which six are shown, the first revolving in one direction and the remainder in the opposite direction as indicated by the arrows. These brushes act on the confections as they pass along on a wire or like conveyor $m^1$ to the front end of which they are fed by the screen $l$ and first brush $m$. By providing a sufficient number of said brushes, which may be arranged all in a row, the confections may be entirely cleaned of starch or powder by the time they reach the delivery end of the conveyor $m^1$ from which they are discharged by a chute $m^2$ or other appropriate means. The brushes are suitably all carried in bearings on side bars or frames $m^3$ which may be provided with means of adjustment such as screw gear $m^4$ to take up the wear of the brushes against the conveyor.

The brushes are suitably all arranged in a casing $n$ provided with a hood $n^2$ hinged at $n^3$ and provided with a handle $n^4$ so that it may be lifted about its hinges for inspection and adjustment or repair of the brushes, and the starch or powder removed by the brushes and falling through the conveyor $m^1$ falls into a chamber $n^1$ in the base of the casing, from which it may be automatically removed by a slat conveyor or paddle $n^5$ up an inclined surface $n^6$ back to the chamber $i^1$ where it is dealt with by the paddle or conveyor $j$ as previously explained.

The particular driving mechanism by which the movement of the conveyors and brushes is effected may be of any known or suitable kind and forms no essential part of the invention, but as mentioned above it is arranged exteriorly of the casings or compartments for the purpose stated.

What I claim as my invention and desire to secure by Letters Patent of the United States is:—

1. In apparatus for the manufacture of confectionery the combination of an openwork conveyor, a series of rotary brushes co-operating with said conveyor to remove moulding material from the confections and a perforated screen partly surrounding the first of said brushes, between which and said first brush the confections are fed and by which they are guided in co-operation with the brush to the openwork conveyor, and a vibratory screen initially receiving the confections and moulding material, said vibratory screen conveying the confections partly relieved of moulding material to the first-mentioned perforated screen.

2. In apparatus for the manufacture of confectionery, the combination of an openwork conveyor, a series of rotary brushes co-operating with said conveyor to remove moulding material from the confections, a perforated screen partly surrounding the first of said brushes, between which and said first brush the confections are fed and by which they are guided in co-operation with the brush to the openwork conveyor, and means for collecting and conveying away the moulding material removed by the brushes for further moulding operations.

In witness whereof I have signed this specification.

WALTER SAWFORD DYE.